US007348979B2

(12) United States Patent
Tso

(10) Patent No.: US 7,348,979 B2
(45) Date of Patent: Mar. 25, 2008

(54) DISPLAY AND METHOD OF PROVIDING A VISUAL DISPLAY OF MULTIPLE TIME SERIES DATA

(75) Inventor: Horace Wei Her Tso, Hong Kong (HK)

(73) Assignee: Horace W. Tso, Vancouver, WA (US)

( * ) Notice: Subject to any disclaimer, the term of this patent is extended or adjusted under 35 U.S.C. 154(b) by 268 days.

(21) Appl. No.: 10/094,481

(22) Filed: Mar. 8, 2002

(65) Prior Publication Data
US 2003/0169256 A1  Sep. 11, 2003

(51) Int. Cl.
G06T 11/20 (2006.01)
(52) U.S. Cl. ..................... 345/440; 345/440.1
(58) Field of Classification Search .............. 705/35, 705/37; 345/440, 440.1, 440.2
See application file for complete search history.

(56) References Cited

U.S. PATENT DOCUMENTS

| 4,555,699 | A | * | 11/1985 | Citron et al. ............... 345/179 |
| 5,347,452 | A | | 9/1994 | Bay, Jr. ...................... 364/408 |
| 5,462,438 | A | | 10/1995 | Becker et al. .............. 434/430 |
| 5,774,878 | A | * | 6/1998 | Marshall ....................... 705/35 |
| 6,023,280 | A | | 2/2000 | Becker et al. .............. 345/440 |
| 6,188,403 | B1 | * | 2/2001 | Sacerdoti et al. ........... 715/764 |
| 6,195,103 | B1 | | 2/2001 | Stewart ..................... 345/440 |
| 6,211,880 | B1 | | 4/2001 | Impink, Jr. ................. 345/418 |
| 6,222,540 | B1 | * | 4/2001 | Sacerdoti ..................... 345/581 |
| 6,369,820 | B1 | * | 4/2002 | Bertram et al. ............. 345/440 |
| 6,667,743 | B2 | * | 12/2003 | Bertram et al. ............. 345/440 |
| 7,043,449 | B1 | * | 5/2006 | Li et al. ................... 705/36 R |
| 7,212,208 | B2 | | 5/2007 | Khozai | |
| 2002/0055899 | A1 | * | 5/2002 | Williams ...................... 705/37 |
| 2002/0194114 | A1 | * | 12/2002 | Erdmier ....................... 705/37 |
| 2003/0110124 | A1 | * | 6/2003 | Escher ........................ 705/38 |
| 2003/0120535 | A1 | * | 6/2003 | Duka .......................... 705/10 |

OTHER PUBLICATIONS

Microsoft® Excel 2000 Help Index (Screen prints from the help menu of Excel program).*
Gramza, Daniel. "ChronoGraphics trading edge", Futures; Apr. 2001; 30,5; p. 34.*
Microsoft® Excel 2000 Help Index.*

* cited by examiner

Primary Examiner—Kee M. Tung
Assistant Examiner—Michelle K Lay

(57) ABSTRACT

A display for showing the inter-dependence of a plurality of time series each varying in different defined sessions includes a plurality of composite geometric objects representative of one of the time series. The objects are positioned sequentially in order of the time of their first value, and plotted against an axis representative of a percentage deviation from a pre-determined reference value. Lines are drawn between geometric objects. A first line connects an object with a point on an adjacent object corresponding to its time series value at the same instant in time. A second line connects a point on an object corresponding to the last value in the defined session of its time series with a point on another object corresponding with its time series value at the same instant in time.

20 Claims, 7 Drawing Sheets

DISPLAY AND METHOD OF PROVIDING A VISUAL DISPLAY OF MULTIPLE TIME SERIES DATA

BACKGROUND TO THE INVENTION

1. Field of the Invention

This invention relates to displays and in particular to the visual display of multiple time series data.

2. Background Information

The need to monitor multiple financial markets is well known. Participants of international securities investing have observed the increasing influence of one market over another, particularly during the minutes and hours immediately following the occurrence of some unexpected event of global proportion. Movement in one market tends to spread to adjacent markets almost instantaneously. When an event occurs at a time when some financial markets are closed, its expected impacts, as sometime measured by the opening gap, could be gauged by observing the behavior of those markets in session.

Traders often employ multiple intra-day charts, which plot the tick-by-tick changes of a particular stock market index or security, to track the international cross current. For example, during the Asia trading hours, participants may monitor the intra-day movement of Japan's Nikkei 225, Hong Kong's Hang Seng Index, and Australia's All Ordinary Index. Right after the afternoon sessions begin, traders in Asia would shift their attention to the imminent opening of the European markets, as they represent a more institutional phenomenon. European investors, on the other hand, often decide their opening bids and offers based on the behavior of the Asian markets.

In one explanation, the need to monitor multiple markets is said to arise because traders in one region of the world often look for clues from foreign markets that may reinforce or reverse the existing trends in their home market. Empirically, this type of short-term interdependence has deepened over the years, particularly among the five highly liquid, actively traded exchanges, namely, New York, Tokyo, Hong Kong, London, and Frankfurt.

Although the known display of multiple, standalone tick-by-tick charts on a single computer screen is rich with current market information they have disadvantages which hamper rapid decision making. The disadvantages are set out below.

Firstly, it is difficult to look back at past trading interaction between different markets and instruments. For example, Dow Jones Industrial Average may have in the past week exhibited greater daily influence upon the UK FTSE 100 index than on the German DAX Index. Such pattern would not be obvious by looking at their individual single day tick behavior on a standalone basis.

Secondly, existing charts tend to ignore the fact that different markets have different trading hours. There are non-overlapping periods where the source of influence on a market is different. An overlaid chart plotted against a single time line can be constructed to display multiple markets. However, a much larger amount of real time data is needed. If a user monitors six markets over the course of a day and if he/she chooses a minute plot, one period will require more than 2,000 data points. Further, such displays are confusing and difficult to extend beyond one period. Multiple lines criss-crossing in a narrow area of a multi-period chart are difficult to read.

Thirdly, as a practical matter, economy of display area is an issue. Both the tick chart and the overlaid plot take up a large portion of the computer screen, making it difficult to show other live information.

Finally, for analysts examining the past behavior of stock markets, it is currently difficult to reconstruct the past market interaction using currently available historic database. Most of these databases keep no more than four data points (open, high, low, close) on any particular day.

SUMMARY OF THE INVENTION

It is an object of the present invention to provide a simple and concise display that presents both current (real-time) and historic information about financial market inter-dependence.

It is another object of the present invention to provide a visual representation that shows in a single display the movements of a plurality of time series over multiple periods.

It is another object of the present invention to provide a concise display occupying a small portion of a computer screen that shows in real time the behavior of a plurality of the time series.

It is another object of the present invention to identify and visualize the extent of which one market depends on another.

It is another object of the present invention to identify the phenomenon of market leadership, or the prominent role one particular market plays over others.

A further object of the present invention to ameliorate the above-mentioned disadvantage or at least to provide the public with a useful alternative.

According to a first aspect of the invention there is provided a visual display including a unitized scale, two or more display elements representing dynamic data series, the display elements being disposed sequentially, and means operative to manipulate display elements in response to changes in the data series. Each display element includes an elongate bar for indicating the range of the data series relative to the unitized scale, a first marker for indicating the initial value of the series in a defined session, and second marker for indicating the instantaneous value of the data series.

According to a second aspect of the invention there is provided a visual display including a unitized scale, two or more display elements representing dynamic data series and one or more linking elements. Each display element includes an elongate bar for indicating the range of the data series relative to the unitized scale, a first marker for indicating the initial value of the series in a defined session, and second marker for indicating the instantaneous value of the data series. The display elements are disposed sequentially relative the unitized scale, at least one of the linking elements disposed between points on adjacent display elements.

In one embodiment, a first linking element is fixedly disposed between the first marker of a second display element and a point on an adjacent first display element corresponding to the same instant in time, and a second linking element is dynamically disposed between the second markers of the first and second display elements. At the end of the defined session of at least one of the display elements the second linking element are fixedly disposed between the points on the display elements corresponding to said end of the defined session.

In one embodiment, the display is divided into at least first and second portions, the first portion having at least first and second display elements representing dynamic data series over a first defined period, and the second portion having at least first and second display element representing the dynamic data series over a second defined period. One of the display elements is designated as the master reference in each portion. The display elements are scaled to the unit of this master element.

In one embodiment, one or more second linking elements are dynamically disposed between the second marker of a first display element and the second marker of an adjacent display element, as well as the second marker of other display elements positioned beyond said adjacent element. At the end of the defined session of at least one of the display elements, the second linking element connecting the first display element and one other display element is fixedly disposed between the points on the display elements corresponding to said end of said defined session.

According to a third aspect of the invention there is provided a display for indicating the inter-dependence of a plurality of time series each varying in different defined sessions. The display includes a plurality of composite geometric objects representative of one of the time series. The objects are positioned sequentially in order of the time of their first value, and plotted against an axis representative of a percentage deviation from a pre-determined reference value.

In one embodiment, each of the geometric objects includes an elongate bar whose first and second ends represent the highest and lowest values of the time series during the defined session, a first marker protruding from the bar whose position represents the first value of the time series in the defined session, and a second marker on the bar whose position represents the instantaneous value of the time series in the defined session. The pre-determined reference value for each time series is the last value of a preceding defined session.

In said embodiment, a first line is drawn between two adjacent geometric objects, the line connecting the first marker of the second object with a point on the first object corresponding to its time series value at the same instant in time as the first marker of the second object. A second line may be drawn between two adjacent geometric objects, the line connecting a point on the first object corresponding to the last value in the defined session of its time series with a point on the second object corresponding with its time series value at the same instant in time as the last value in the first object time series.

In said embodiment, a pre-selected color may be applied to the quadrilateral formed by the bars of the two adjacent objects and the first and second lines. If the first line is above the second line a first pre-selected color is applied to the quadrilateral, or if the second line is above the first line a second pre-selected color is applied to the quadrilateral.

In one embodiment, one or more second lines may be drawn between geometric objects. These lines connect the second marker of a first object with the second marker of an adjacent object, as well as the second marker of other objects positioned beyond said adjacent object. The two end points of these lines represent the value of the corresponding time series at the same instant in time.

According to a forth aspect of the invention there is provided a visual display including a unitized scale, two or more display elements representing dynamic data series, each display element including an elongate bar for indicating the range of the data series relative to the unitized scale, a first marker for indicating the initial value of the series in a defined session, and second marker for indicating the instantaneous value of the data series, the display elements being disposed sequentially, and means operative to manipulate display elements in response to changes in the data series.

According to a fifth aspect of the invention there is provided a method of indicating the inter-dependence of a plurality of dynamic data series including, on a computer, displaying a unitized scale, at least first and second display elements representing dynamic data series, and at least first and second linking elements. The display elements include an elongate bar for indicating the range of the data series relative to the unitized scale, a first marker for indicating the initial value of the series in a defined session, and a second marker for indicating the instantaneous value of the data series. The display elements are disposed sequentially relative the unitized scale. The first linking element fixedly disposed between the first marker of the second display element and a point on the first display element corresponding to the same instant in time. The second linking elements dynamically disposed between the second markers of the display elements, and at the end of the defined session of at least one of the display elements the second linking elements being fixedly disposed between the points on said display elements corresponding to said end of the defined session. The display is updated in substantially real time.

Preferably, the method includes storing the output of the display for later retrieval.

Preferably, the method includes storing six data values relating to each data series, said data values representing:

the last value of the series in the period immediately preceding the defined session, the initial value of the series in the defined session, the high value of the series in the defined session, low value of the series in the defined session, the value of a subsequent series at the instant in time of the last value of the series in the defined session, and the value of a preceding series at the instant in time of the first value of the series in the defined session.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 7:
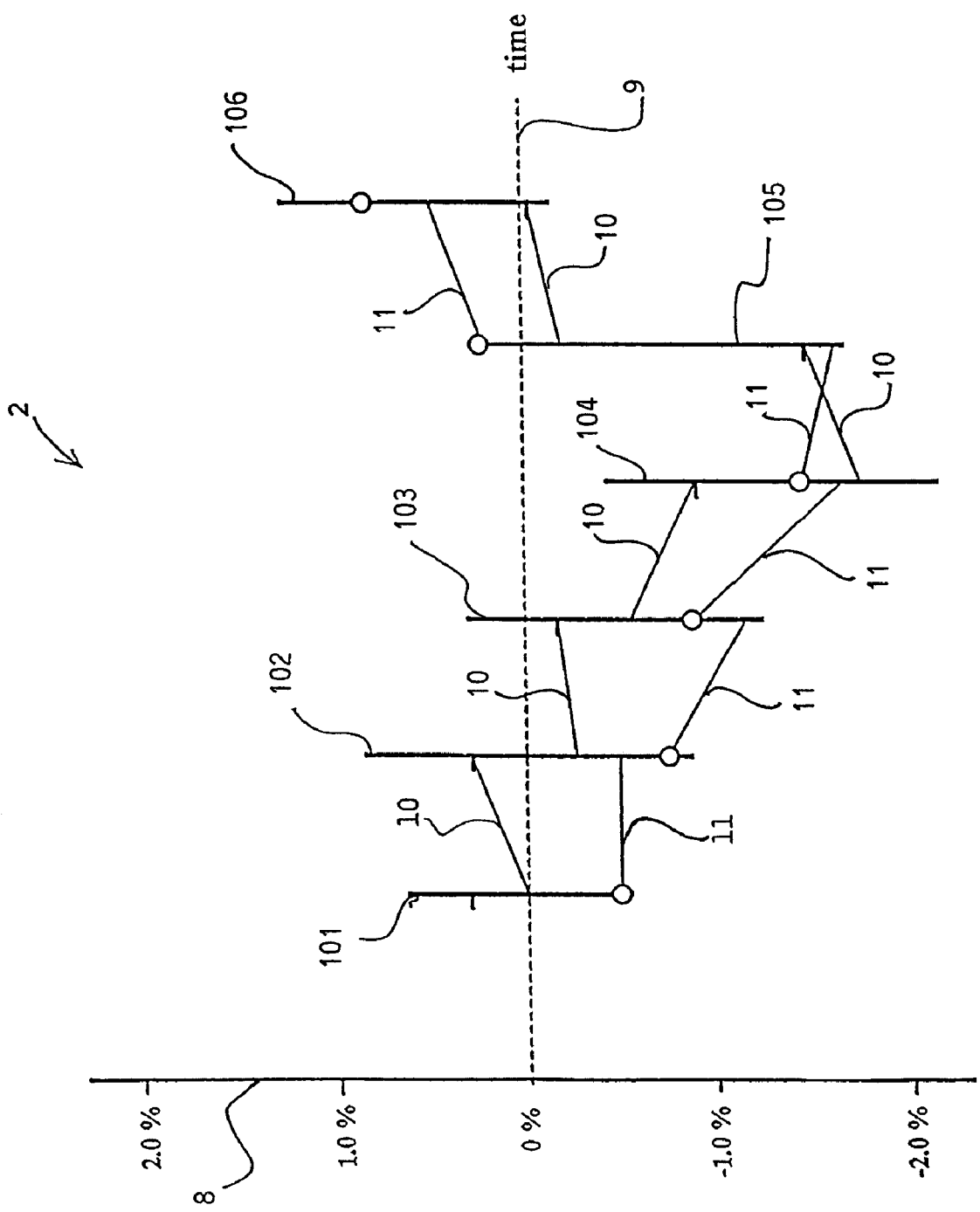
FIG. 7 illustrates multiple elements in the one-period display.

A display 2 according to the invention is illustrated in FIG. 7. In the embodiment the display 2 is directed to the analysis of intra-day behavior of a plurality of securities trading in different defined sessions.

As used herein, the term "security" refers to anything that can be traded with a quantity and/or price. It includes, but is not limited to, all types of financial products, such as stocks, bonds, commodities, options, futures, currency, mutual funds, derivatives as well as any combination of these objects. The security could be "real", such as products that are listed by an exchange for trading, or "synthetic," such as a collection of real products created by the trader. An example of such securities would be the Nikkei 225 index of the Japanese equity market. Each security has a defined trading session or open period. Securities may trade in different trading sessions. Trading sessions are different if they have different opening and/or closing times. Different trading sessions may exist in the same time zone. Securities trading in different time zones may have the same trading session.

For illustration purposes, the securities shown in FIG. 7 are international stock exchanges trading in different sessions in different time zones. The information can be considered a plurality of dynamic data or time series. The display consists of a plurality of display elements 1 (refer to FIG. 1) representing a series from each of the plurality of pre-selected markets under observation, arranged with equal horizontal spacing on a two-dimensional surface. In the embodiment the elements 1 represent the benchmark index for each stock market. Where more than one display element 1 is shown in the same figure, they are labeled 101, 102, 103, 104, 105 or 106 for clarity.

The vertical axis 8 represents the percentage deviation of an index level from an assigned selected reference value, e.g., the index value at the end of the previous trading session. The vertical axis need not be a percentage but may be any other unitized scale. A unitized scale is a common scale on which different time series could be compared. There are many such unitized scales. For example, a scale in the unit of standard deviation is a unitized scale. A horizontal line 9 represents the zero mark of the vertical axis 8. If an index is above the zero level, it has risen with respect to its previous closing; likewise, an index below zero means it has dropped. Each component always compares with its own reference value one period before.

The horizontal axis, represented by line 9, is time. The location of each element 101-106 on the time axis represents the sequential order of opening time of its corresponding market. For example, the element 105 representing London appears to the left of the element 106 representing New York as London opens six hours ahead of the New York stock exchange.

Figure 1:
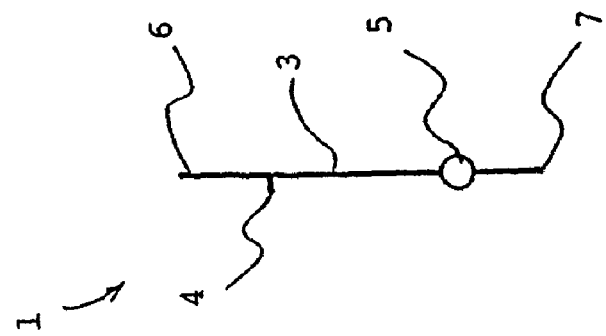
FIG. 1 is an illustration of a basic element of a one-session display according to the invention.

Referring to FIGS. 1 and 7, each element 1 of the displays consists of three geometric members: an elongate vertical bar 3, a small horizontal marker 4 protruding from the left side of the vertical bar 3, and a circle 5 (with diameter equal to the length of the horizontal marker 4) centered on the vertical bar 3. The vertical bar 3 represents the range of the index's values. The top 6 of the vertical bar 3 represents the highest level during the day of the corresponding index as a percentage deviation from the reference level. The bottom 7 of the vertical bar 3 corresponds to the lowest index level as a percentage deviation from the same reference level. The horizontal marker 4 indicates the opening level of the index for a particular session. For each element 1 the horizontal marker 4 is fixed once the specific stock exchange commences trading. The circle 5 is the current level of the index. The position of circle 5 is updated continuously in real time. Circle 5 is always on vertical bar 3 as the current level must equal to, less than the high or greater than the low.

Each element 101-106 of display 2 in FIG. 7 represents the data or time series of one market benchmark index. The display 2 begins with one element 101 and additional elements 102-106 are added as trading in one or more markets begin. The number of markets (thus elements 101-106) on the display 2 is pre-selected by the user.

Scale of the time axis 9 is only symbolic. The distance of an element, e.g. element 101, from the vertical axis 8 is not meant to be proportional to the actual time lapsed since the opening of the corresponding exchange. The importance is the ordering of the elements in time. Similarly, the width separating one element from the next does not reflect the time difference of the opening of the corresponding exchanges. The time axis 9 always completes one 24-hour period. The beginning and end of this period, however, need not coincide with the beginning and end of one calendar day. The start of the display is chosen by the user to suit his or her analytic purposes.

Figure 2:
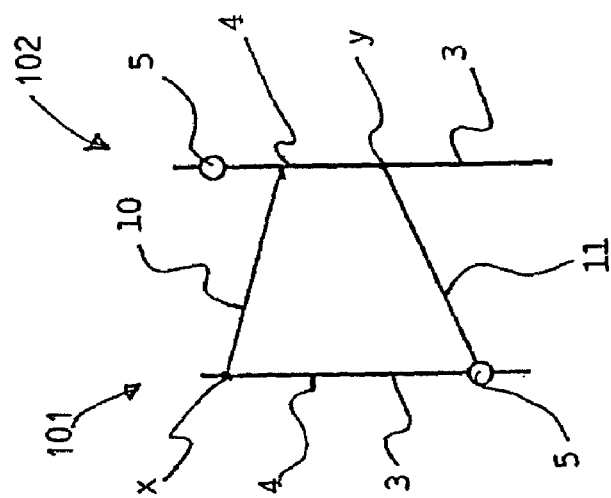
FIG. 2 is an illustration of the construction of lines linking two adjacent elements together in the one-session display.

Referring to FIG. 2, every element 101-102 on the display is linked geometrically to exhibit the overall real time dynamic. A line 10 is drawn from the intersection between the horizontal marker 4 and the vertical bar 3 of an element 102 to a point x on the vertical body 3 of the preceding element 101. The line 10 represents the level of the current market at the instant in time when the ensuing market opens, and is fixed. A second line 11 is added linking the current level of two adjacent elements. Each market has a defined trading session or open period. When two markets are in session, the second line 11 is drawn from the center of one circle 5 to that of the other circle 5 and is updated continuously to reflect their respective changes. As soon as a market closes at the end of its session, line 11 is fixed at the moment of closing. In FIG. 2, when the market represented by left most element 101 closes, line 11 becomes fixed at a point y on the next element 102. The market represented by right element 102 is still in session, thus circle 5 continues to move while point y is fixed.

As markets open, corresponding elements, such as illustrated in FIG. 1, are added to the display, and as markets close, corresponding lines 11 are fixed. When the display 2 (refer to FIG. 7) is fully drawn at the end of the period (day) the right hand side of all the lines 11 should rest on the corresponding index level y of the next market when the closing of the preceding market occurred.

Figure 3:
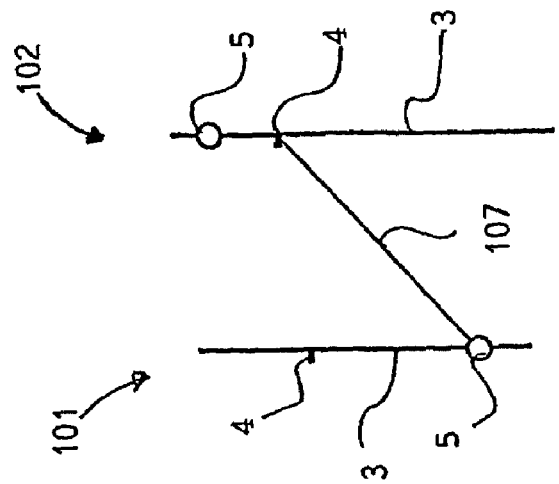
FIG. 3 illustrates the case of two non-overlapping markets where the lines linking the adjacent elements coincide.

The above discussion assumes that each and every market overlaps with the previous one. Hence, the opening of the next market always comes before the closing of the preceding market. When there is no overlap, only one line is drawn connecting the early closing with the later opening. This is illustrated in FIG. 3 where line 10 corresponds to the position of line 11, i.e. they are one and the same line 107. In this case, there is one fewer line in the display, conveying the intuitive idea that there is a greater degree of separation between the two markets.

Figure 4B:
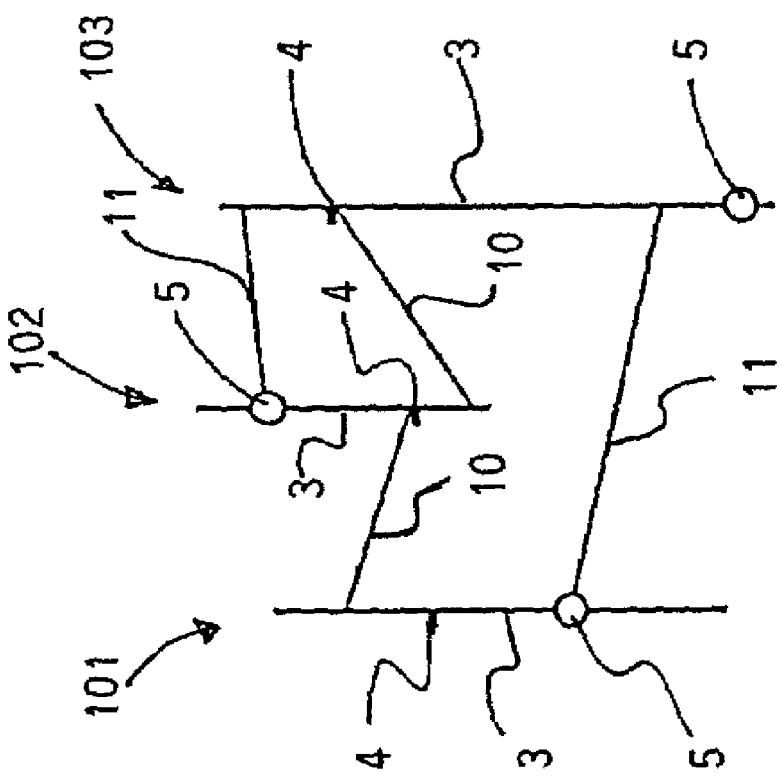
FIGS. 4A and 4B illustrate a situation where one market trades passed the closing of the second market into the time of a third market.
Figure 4A:
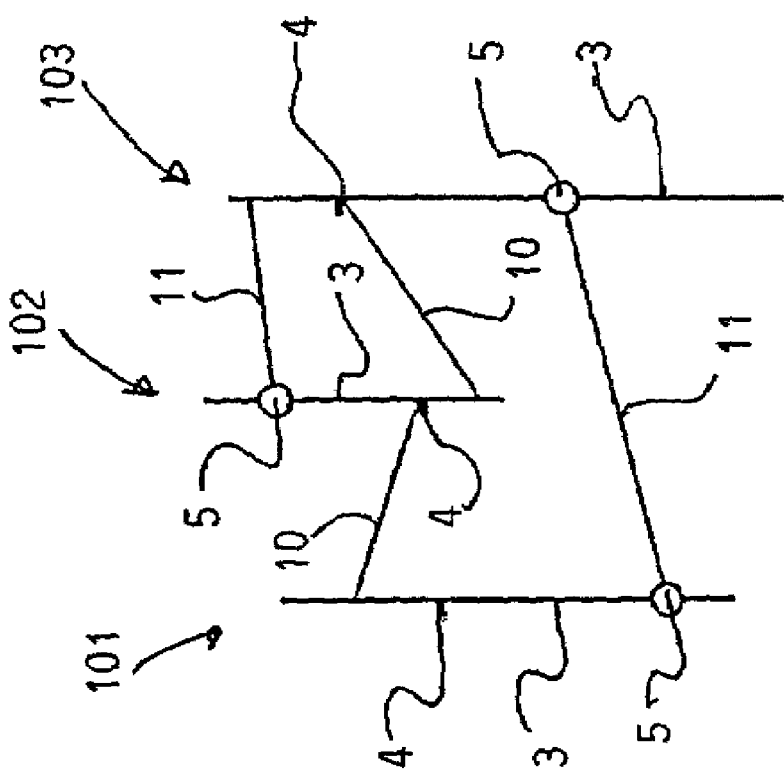

The length of each trading session is not important to the invention. Only the sequential order of the opening times is. FIGS. 4 and 5 illustrate the situation where one market opens earlier and closes later. In this situation second line 11 would extend pass the immediate right hand element 102 to connect with the subsequent element 103. In FIG. 4A the market represented by element 101 is active, the market represented by element 102 has closed, and the market represented by element 103 has just open for trading. FIG. 4B captures a later time when both the markets represented by element 101 and the market represented by element 102 are closed while the market represented by element 103 remains open.

Figure 5B:
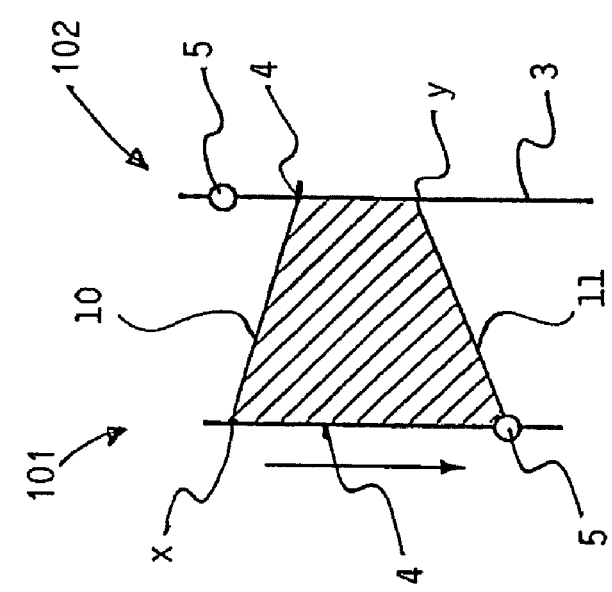
FIGS. 5A and 5B illustrate the use of different colors to mark the directional influence of one market on the next.
Figure 5A:
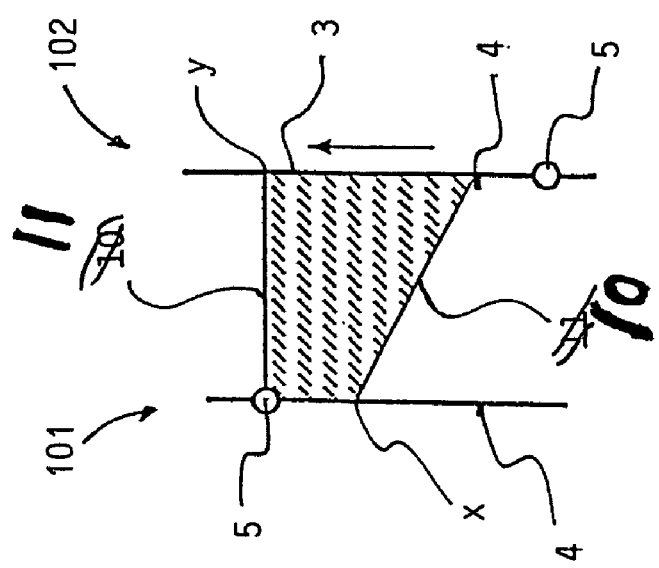

Once a particular market is closed, an additional visual element is added to the display to mark the similar trading pattern between the current and the preceding markets. Referring to FIGS. 5A and 5B, the element 102 that represents the market just closed has two lines 10, 11 connecting it with the element 101 of the preceding market. There are two possible geometric configurations.

In the first possible geometric configuration, either the second line 11 is above the first line 10, or vice versa. In either case a quadrilateral is formed. When the second line 11 is on top the quadrilateral is filled with a first pre-selected pattern or color as shown in FIG. 5A. When the first line 10 is on top the quadrilateral is filled with a second pre-selected pattern or color as shown in FIG. 5B.

Figure 6:
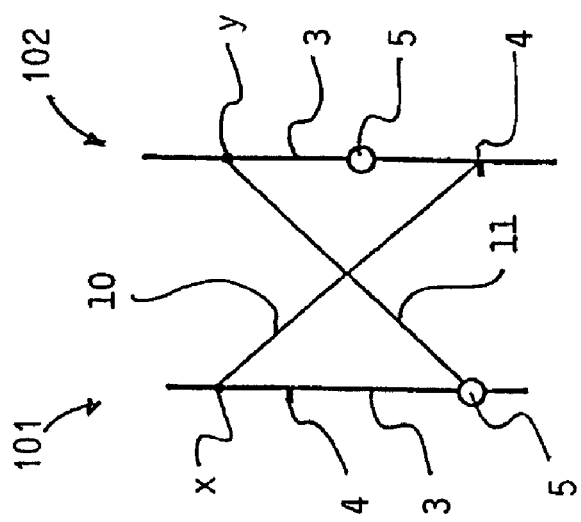
FIG. 6 illustrates the relative influence of two markets where no color is applied.

In the second possible geometric configuration lines 10 and 11 intersect, or cross, forming two triangles whose vertices touch at the point of intersection. This is illustrated by FIG. 6.

Figure 4C:
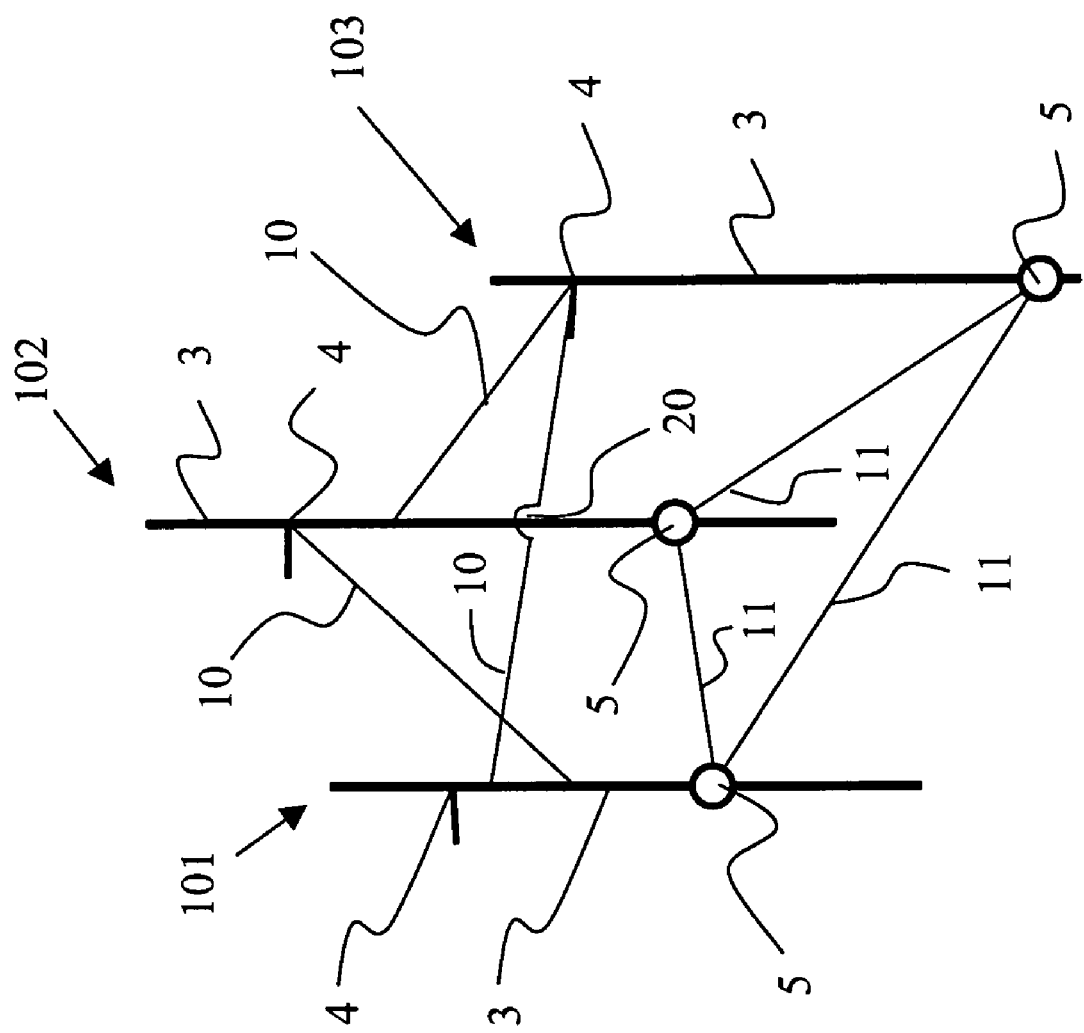
FIG. 4C illustrates a situation where all three markets are trading; it illustrates the use of two first linking elements to mark the opening level of the third market, and the use of three second linking elements to connect their instantaneous values.

FIG. 4C illustrates one situation when all three markets represented by element 101, 102, and 103 are in session. Each circle 5 has two lines connecting to the circle of the other two elements. All three circles represent the instantaneous value of the three elements at the same instant in time. Two lines emanate from the protruding horizontal marker 4 of element 103, connecting to a point on element 102 and 101. These two points correspond to the value of element 101 and 102 at the time when element 103 opens. The small semi-circle 20 at the intersection between the connecting line 10 from element 103 and the elongate bar of element 102 serves to remind users that this line 10 does not intersect element 102.

Figure 4E:
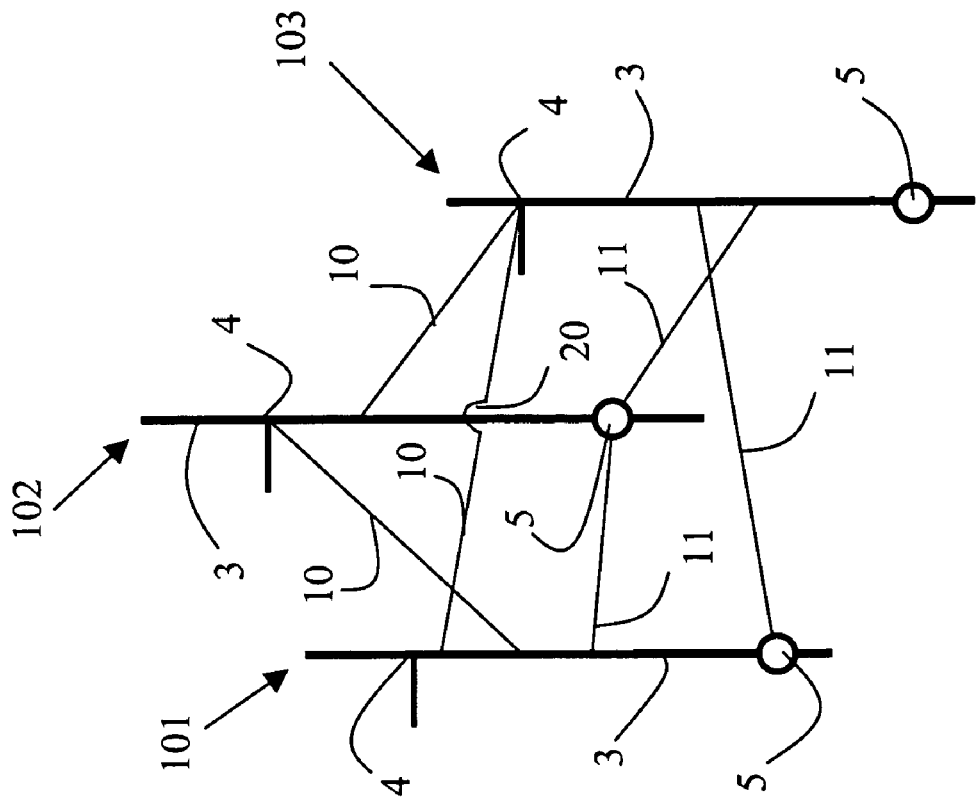
FIG. 4E illustrates a situation where all three markets are closed and the third market trades passed the first market.
Figure 4D:
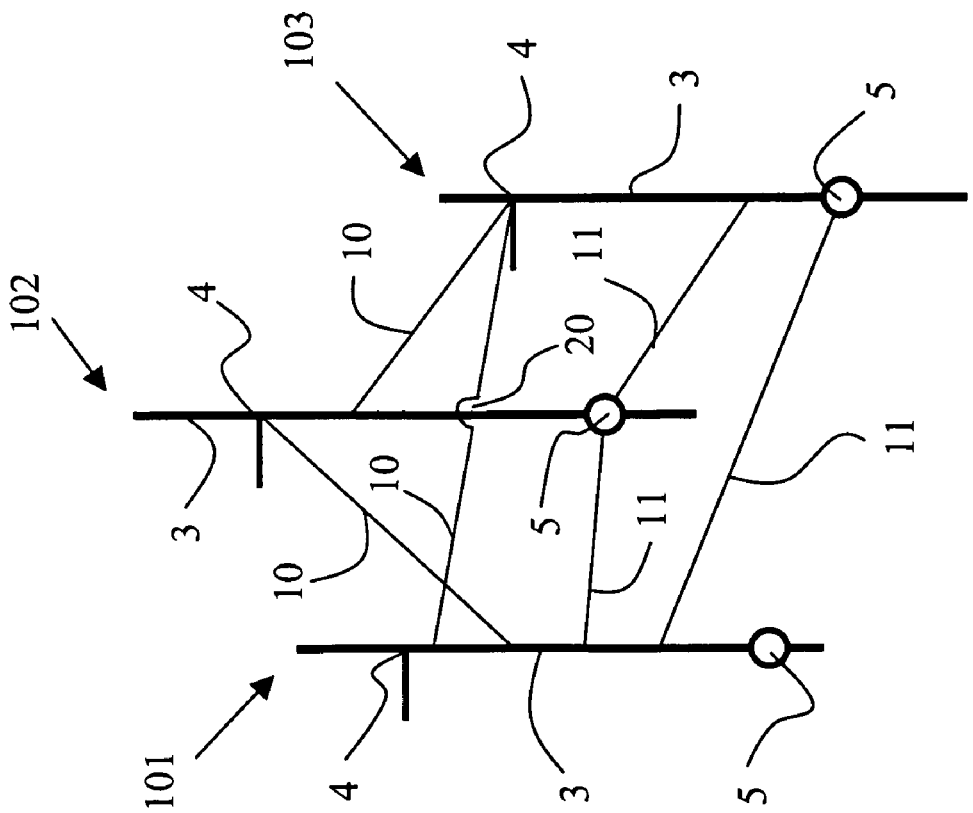
FIG. 4D illustrates a situation where all three markets are closed and the first market opens longer than both the second and third.

FIG. 4D captures the situation where the first market 101 trades passed the second 102 and the third market 103; and the third market 103 closes after the second market 102. When all three have finished their sessions, two lines are drawn from the circle of element 102, linking it to a value on element 101 and 103 at the instant of its closing. Only one line connects the circle of element 103 to element 101 because the adjacent element 102 has already closed by the time the session of element 103 ends. The two points connected by this line are simultaneous instants of element 101 and 103. Two linking lines emanated from the protruding marker of element 103 are present in this illustration, representing the situation as described in the preceding discussion of FIG. 4C. The small semi-circle 20 at the intersection on element 102 reminds users that line 10 from element 103 does not intersect element 102.

FIG. 4E illustrates another possible situation where the third market 103 trades passed the first market 101 and second market 102. Only one line is drawn from the circle on element 101 to a point on element 103 since market 102 is already closed by the time market 101 finishes. Two lines emanate from the circle of element 102 because both market 101 and 103 are still in session when 102 closes. Two linking lines emanated from the protruding marker of element 103 are present in this illustration, representing the situation as described in the preceding discussion of FIG. 4C. The small semi-circle 20 at the intersection on element 102 reminds users that line 10 does not intersect element 102.

The display 2 is complete when the last pre-selected market is closed for the day. FIG. 7 illustrates a finished display 2 for one full period of the pre-selected markets.

In said embodiment a one-period display 2 is stored in a computer using the following data structure.

A vector of six dimensions describes the one-period behavior of a display element. The vector is:

$$U_i(t) = (mc_i(t), mo_i(t), mh_i(t), ml_i(t), mxc_i(t), mpo_i(t))$$

Wherein $mc_i(t)$ is the close as measured in percentage deviation from previous close for the $i^{th}$ pre-selected market in period t; $mo_i(t)$, $mh_i(t)$, $ml_i(t)$, are the percentage open, high, low for the $i^{th}$ pre-selected market in period t, respectively, $mxc_i(t)$ is the position, in percentage deviation term, of the next market at the time when the $i^{th}$ market closes, and $mpo_i(t)$ is the percentage position of the previous market when the $i^{th}$ market opens.

If i=0 to N−1, where N is the number of pre-selected markets represented by display elements 1, the display is an array of the u(t) vectors $$X(t) = (u_0, u_1, \ldots u_{N-1}),$$

where each vector contains the six data points of each display element.

The data must obey two boundary conditions, namely mxcN=NULL and mpo0=NULL.

In terms of computer storage, the entire period of real time market interactions is captured with 6N floating point numbers, equivalent to approximately 24N bytes in the conventional real number representation.

Figure 8:
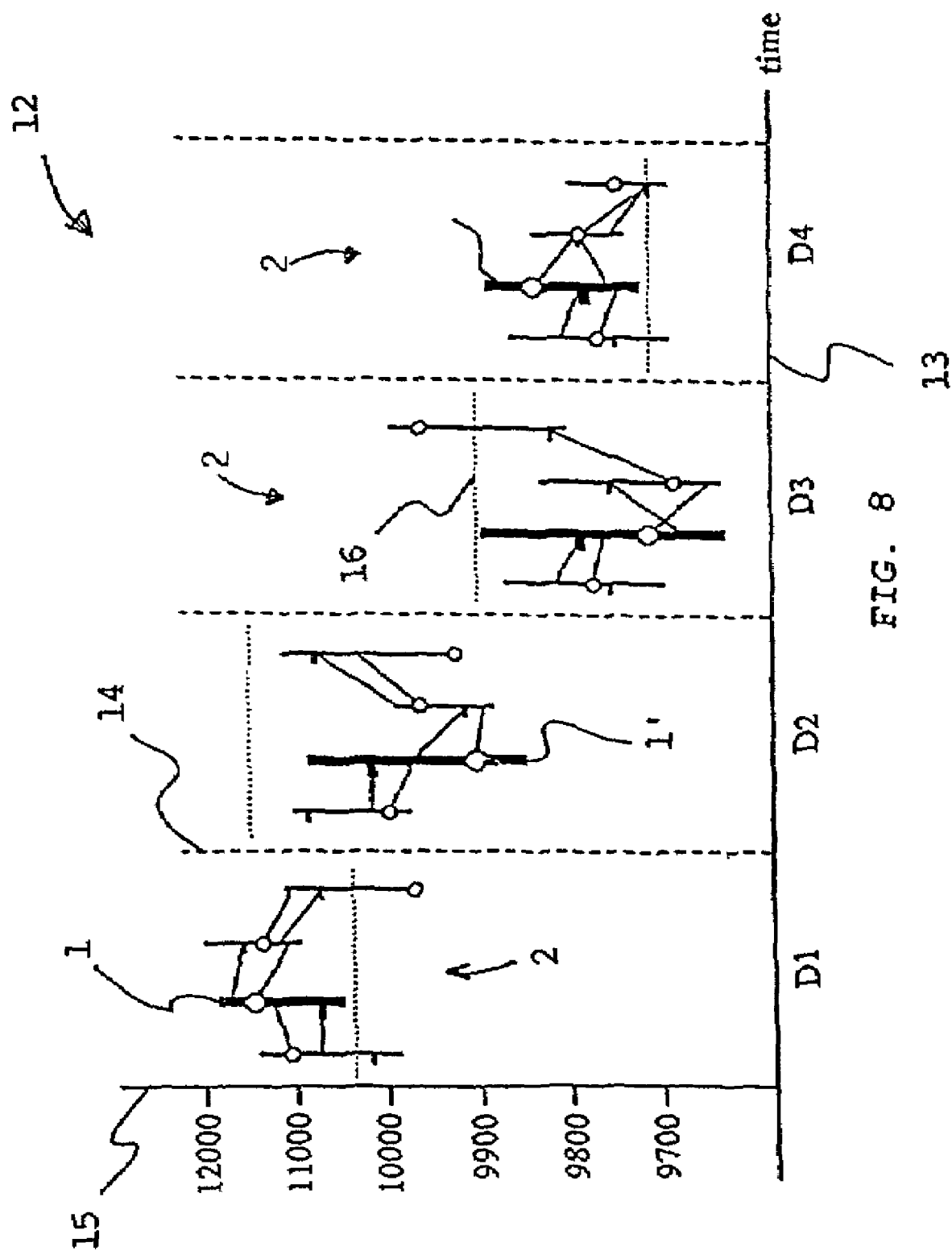
FIG. 8 illustrates a display showing multiple periods.

Referring to FIG. 8, more than one period can be combined to form a larger display 12 to show the historic movement of a single security or index. The aggregate display 12 has a horizontal axis 13 divided into equal spacing, each representing one pre-defined period D1, D2, D3, D4, such as a calendar day. Each period D1, D2, D3, D4 is separated by a vertical dash-line 14. The vertical axis 15 represents the scale of one pre-defined market and serves as the master reference for the aggregate display 12. In each period D1, D2, D3, D4, between two dash lines 14, a one-period display 2 is inserted. Each period D1, D2, D3, D4 has a sub reference indicated by horizontal lines 16, and is associated with a calendar date as defined by a master reference market. The element 1 representing the master reference market is made bold and drawn with a pre-selected color to differentiate from the other elements representing other accompanying markets.

The one-period components, all defined in percentage terms, are adjusted to accommodate the different scale. Let $MC_i(t)$, $MO_i(t)$, $MH_i(t)$, $ML_i(t)$, $MPO_i(t)$, $MXC_i(t)$ be the close, open, high, low, position of previous market at open, position of next market at close of the $i^{th}$ market for period t, re-calculated to the new scale. Let r be the master reference market on which the aggregate display is based. We define, for period t, the scaling factor Z, and the y-axis offset D as follows, $$Z(t) = (MO_r(t) - MC_r(t-1))/mo_r(t);$$

$$D(t) = MC_r(t-1).$$

Then, the new vector can be calculated as follows, $MO_i(t)=D+Z*mo_i(t);$ $MC_i(t)=D+Z*mc_i(t);$ $MH_i(t)=D+Z*mh_i(t);$ $ML_i(t)=D+Z*ml_i(t);$ $MXC_i(t)=D+Z*mxc_i(t);$ $MPO_i(t)=D+Z*mpo_i(t);$ where i=0 to N−1 but not equal to r.

FIG. 8 shows one form of the aggregate display 12 implementing the scale conversion. Users of the aggregate display are reminded there are two classes of objects and only one should read off the left axis. In a one-period display, positions of all the markers and circles are relative changes, where the left axis provides the percentage figures. In the aggregate display 12, only the r components have meaningful interpretation against the left axis. The other components reflect their relative changes with respect to the r market during the specific session.

Where in the foregoing description reference has been made to integers or elements have known equivalents then such are included as if individually set forth herein.

Embodiments of the invention have been described, however it is understood that variations, improvement or modifications can take place without departure from the spirit of the invention or scope of the appended claims.

What is claimed is:

1. A visual display including:
a unitized scale,
two or more display elements representing dynamic data series of securities trading in different defined sessions, each display element including an elongate bar for indicating the range of the data series relative to the unitized scale, a first marker for indicating the initial value of the series in a defined session, and second marker for indicating the instantaneous value of the data series,
a symbolic axis for indicating the time ordering of the display elements,
the display elements being disposed sequentially at spaced apart locations on the symbolic time axis relative to the unitized scale,
one or more linking elements,
at least one of the linking elements disposed between points on adjacent display elements.

2. A display as claimed in claim 1 wherein a first linking element is fixedly disposed between the first marker of a second display element and a point on an adjacent first display element corresponding to the same instant in time, and a second linking element is dynamically disposed between the second markers of the first and second display elements, said linking element representing the inter-dependence of the corresponding display elements.

3. A display as claimed in claim 2 wherein at the end of the defined session of at least one of the display elements the second linking element is fixedly disposed between the points on the display elements corresponding to said end of the defined session.

4. A visual display including:
a unitized scale,
at least first and second display elements representing dynamic data series of securities trading in different defined sessions,
the display elements including an elongate bar for indicating the range of the data series relative to the unitized scale, a first marker for indicating the initial value of the series in a defined session, and a second marker for indicating the instantaneous value of the data series,
a symbolic axis for ordering the display elements in time,
the display elements being disposed sequentially at spaced apart locations on the symbolic axis relative to the unitized scale,
a first linking element fixedly disposed between the first marker of a second display element and a point on a first display element corresponding to the same instant in time,
a second linking element dynamically disposed between the second markers of display elements to represent their inter-dependence, and at the end of the defined session of at least one of the display elements the second linking element being fixedly disposed between the points on said display elements corresponding to said end of the defined session.

5. A visual display as claimed in claim 4 wherein the display is divided into at least first and second portions, the first portion having at least first and second display elements representing dynamic data series over a first defined period, and the second portion having at least first and second display elements representing the dynamic data series over a second defined period, each portion having a master reference display element reading on the unitized scale, and the other display elements scaled to the unit of said master element.

6. A display for indicating the inter-dependence of a plurality of time series of securities trading in different defined sessions, the display including a plurality of composite geometric objects representative of one of the time series, the objects positioned sequentially at spaced apart locations in order of the time of their first value, and plotted against an axis representative of a percentage deviation from a pre-determined reference value.

7. A display as claimed in claim 6 wherein each of the geometric objects includes an elongate bar whose first and second ends represent the highest and lowest values of the time series during the defined session, a first marker protruding from the bar whose position represents the first value of the time series in the defined session, and a second marker on the bar whose position represents the instantaneous value of the time series in the defined session.

8. A display as claimed in claim 6 wherein the pre-determined reference value for each time series is the last value of a preceding defined session.

9. A display as claimed in claim 6 wherein a line is drawn between two adjacent geometric objects, the line connecting the first marker of the second object with a point on the first object corresponding to its time series value at the same instant in time as the first marker of the second object.

10. A display as claimed in claim 6 wherein a line is drawn between two adjacent geometric objects, the line connecting a point on the first object corresponding to the last value in the defined session of its time series with a point on the second object corresponding with its time series value at the same instant in time as the last value in the first object time series, said line representing the inter-dependence of the corresponding objects.

11. A display for indicating the inter-dependence of a plurality of time series of securities trading in different defined sessions, the display including:

a plurality of composite geometric objects representative of one of the time series, the objects positioned sequentially on a symbolic time axis at spaced apart locations in order of the time of their first value against an axis representative of a percentage deviation from a predetermined reference value, each geometric object including an elongate bar whose first and second ends represent the highest and lowest values of the time series during the defined session, a first marker protruding from the bar whose position represents the first value of the time series in the defined session, and a second marker on the bar whose position represents the last value of the time series in the defined session, a first line drawn between two adjacent geometric objects, the first line connecting the first marker of the second object with a point on the first object corresponding to its time series value at the same instant in time as the first marker of the second object, a second line drawn between the two adjacent geometric objects to represent their inter-dependence, the second line connecting a point on the first object corresponding to the last value in the defined session of its time series with a point on the second object corresponding with its time series value at the same instant in time as the last value in the first object time series, a pre-selected color applied to the quadrilateral formed by the bars of the two adjacent objects and the first and second lines.

12. A display as claimed in claim 11 wherein if the first line is above the second line a first pre-selected color is applied to the quadrilateral, or if the second line is above the first line a second pre-selected color is applied to the quadrilateral.

13. A display as claimed in claim 11 wherein each of the time series is the benchmark index of a stock market.

14. A display as claimed in claim 11 wherein each of the time series is the benchmark index of a bond market.

15. A display as claimed in claim 11 wherein each of the time series is an index representing a stock market sector from a different stock market.

16. A display as claimed in claim 11 wherein each of the time series is a stock trading in a different stock market.

17. A visual display including:
    a unitized scale,
    a symbolic time axis,
two or more display elements representing dynamic data series of securities trading in different defined sessions, each display element including an elongate bar for indicating the range of the data series relative to the unitized scale, a first marker for indicating the initial value of the series in a defined session, and second marker for indicating the instantaneous value of the data series, and the display elements being disposed sequentially at spaced apart locations on the symbolic time axis, and means operative to manipulate display elements in response to changes in the data series.

18. A method of indicating the inter-dependence of a plurality of dynamic data series including, on a computer, displaying:
    a unitized scale,
    at least first and second display elements representing dynamic data series of securities trading in different defined sessions,
    the display elements including an elongate bar for indicating the range of the data series relative to the unitized scale, a first marker for indicating the initial value of the series in a defined session, and a second marker for indicating the instantaneous value of the data series,
    a symbolic axis for ordering the display elements in time,
    the display elements being disposed sequentially at spaced apart locations on the symbolic time axis relative to the unitized scale,
    a first linking element fixedly disposed between the first marker of a second display element and a point on a first display element corresponding to the same instant in time,
    a second linking element dynamically disposed between the second markers of the display elements to represent their inter-dependence, and at the end of the defined session of at least one of the display elements the second linking element being fixedly disposed between the points on said display elements corresponding to said end of the defined session, and
    updating said display in substantially real time.

19. A method as claimed in claim 18 including means for storing the display for later retrieval.

20. A method as claimed in claim 18 including storing six data values relating to each data series, said data values representing:
    the last value of the series in the session immediately preceding the defined session,
    the initial value of the series in the defined session,
    the high value of the series in the defined session,
    low value of the series in the defined session,
    the value of a subsequent series at the instant in time of the last value of the series in the defined session, and
    the value of a preceding series at the instant in time of the first value of the series in the defined session.

* * * * *